US011370367B2

(12) United States Patent
Goleniak et al.

(10) Patent No.: US 11,370,367 B2
(45) Date of Patent: Jun. 28, 2022

(54) OPEN-FRAME VEHICLE HAVING A TWO-PIECE TRIM MEMBER

(71) Applicant: Ford Global Technologies, LLC, Dearborn, MI (US)

(72) Inventors: Kirk Robert Goleniak, Canton, MI (US); John Rudolph, Beverly Hills, MI (US); Eric Axel Smitterberg, Berkley, MI (US); Chuck R. Reese, Northville, MI (US); Srivardhan Tallapragada, Royal Oak, MI (US); Jay Douglas Blackson, Dryden, MI (US)

(73) Assignee: Ford Global Technology, LLC, Dearborn, MI (US)

( * ) Notice: Subject to any disclaimer, the term of this patent is extended or adjusted under 35 U.S.C. 154(b) by 179 days.

(21) Appl. No.: 16/883,214

(22) Filed: May 26, 2020

(65) Prior Publication Data

US 2021/0370851 A1 Dec. 2, 2021

(51) Int. Cl.
*B60R 13/02* (2006.01)
*B60R 21/213* (2011.01)
*B60R 21/215* (2011.01)
*B60R 21/216* (2011.01)
*B60R 21/23* (2006.01)

(52) U.S. Cl.
CPC ............ *B60R 13/02* (2013.01); *B60R 21/213* (2013.01); *B60R 21/215* (2013.01); *B60R 21/216* (2013.01); *B60R 21/23* (2013.01); *B60R 2013/0287* (2013.01)

(58) Field of Classification Search
CPC ................................................... B60R 13/02
See application file for complete search history.

(56) References Cited

U.S. PATENT DOCUMENTS

| 5,636,862 | A | 6/1997 | Cheung et al. |
| 5,639,115 | A | 6/1997 | Kelley et al. |
| 6,234,515 | B1 | 5/2001 | Iwanaga |
| (Continued) | | | |

FOREIGN PATENT DOCUMENTS

| EP | 3441265 A1 | * | 2/2019 | ......... B22D 11/0657 |
| JP | 2007261291 A | * | 10/2007 | |
| (Continued) | | | | |

*Primary Examiner* — Nicole T Verley
(74) *Attorney, Agent, or Firm* — Vichit Chea; Price Heneveld LLP (57) ABSTRACT

A vehicle includes a frame. The vehicle is an open-frame vehicle. The frame includes an A-pillar, a B-pillar, and a roof siderail. The roof siderail extends between the A-pillar and the B-pillar. An A-pillar trim member is coupled to the A-pillar and includes a first portion and a second portion. The first portion defines an aperture that receives the second portion. A B-pillar trim member is coupled to the B-pillar. A roof siderail trim member is coupled to the roof siderail and extends between the A-pillar trim member and the B-pillar trim member. An inflatable member is positioned between the frame and at least two of the A-pillar trim member, the B-pillar trim member, and the roof siderail trim member when the inflatable member is in a deflated state. An inflated state of the inflatable member separates the second portion of the A-pillar trim member from the aperture of the A-pillar trim member.

20 Claims, 6 Drawing Sheets

(56) References Cited

U.S. PATENT DOCUMENTS

| | | | | |
|---|---|---|---|---|
| 6,296,269 B1 * | 10/2001 | Nagai | ............... | B60R 21/213 |
| | | | | 280/728.2 |
| 6,328,333 B1 | 12/2001 | Patel et al. | | |
| RE38,125 E * | 5/2003 | Shibata | ............... | B60R 21/201 |
| | | | | 280/728.3 |
| 6,893,045 B2 | 5/2005 | Inoue et al. | | |
| 7,445,233 B2 * | 11/2008 | McKimson | ............... | B60R 13/025 |
| | | | | 280/728.2 |
| 7,568,722 B2 * | 8/2009 | Sato | ............... | B60R 13/0243 |
| | | | | 280/728.2 |
| 7,690,676 B2 * | 4/2010 | Jaramillo | ............... | B60R 13/025 |
| | | | | 280/728.2 |
| 7,717,458 B2 | 5/2010 | Tsuge | | |
| 7,841,619 B2 * | 11/2010 | Miyamoto | ............... | B62D 39/00 |
| | | | | 280/728.3 |
| 7,934,746 B2 * | 5/2011 | Glaser | ............... | B60R 13/025 |
| | | | | 280/728.3 |
| 8,297,676 B2 * | 10/2012 | Osterhout | ............... | B60R 13/025 |
| | | | | 296/1.08 |
| 8,360,463 B2 * | 1/2013 | Isayama | ............... | B60R 21/215 |
| | | | | 280/728.3 |
| 8,408,586 B2 * | 4/2013 | Ohmori | ............... | B60R 21/213 |
| | | | | 280/728.2 |
| 8,727,373 B2 * | 5/2014 | Mori | ............... | B60R 21/213 |
| | | | | 280/728.2 |
| 8,840,136 B2 * | 9/2014 | Masatsugu | ............... | B60R 21/213 |
| | | | | 280/730.2 |
| 8,919,867 B2 * | 12/2014 | Davis | ............... | B60R 13/0206 |
| | | | | 296/193.06 |
| 8,955,895 B2 * | 2/2015 | Nakazawa | ............... | B60R 13/0206 |
| | | | | 296/1.08 |
| 9,139,154 B2 * | 9/2015 | Abramoski | ............... | B60R 21/213 |
| 9,387,821 B1 * | 7/2016 | Saunders | ............... | B60R 21/215 |
| 9,586,535 B2 * | 3/2017 | Dalton | ............... | B60R 13/02 |
| 9,771,046 B2 * | 9/2017 | Lee | ............... | B60R 21/239 |
| 10,434,971 B2 * | 10/2019 | Arima | ............... | B60R 21/261 |
| 11,167,715 B2 * | 11/2021 | Ballam | ............... | B60R 21/215 |
| 2007/0137004 A1 | 6/2007 | Baekelandt | | |
| 2007/0241542 A1 * | 10/2007 | Wallace | ............... | B60R 13/02 |
| | | | | 280/730.2 |
| 2008/0197609 A1 * | 8/2008 | Jaramillo | ............... | B60R 21/213 |
| | | | | 280/730.2 |
| 2009/0091103 A1 * | 4/2009 | Zucal | ............... | B60N 3/026 |
| | | | | 280/728.3 |
| 2011/0221172 A1 * | 9/2011 | She | ............... | B60R 13/0206 |
| | | | | 280/730.2 |
| 2014/0312600 A1 * | 10/2014 | Verner | ............... | B60N 3/026 |
| | | | | 280/728.2 |
| 2020/0139919 A1 * | 5/2020 | Beltran | ............... | B60R 13/025 |

FOREIGN PATENT DOCUMENTS

| | | | | | |
|---|---|---|---|---|---|
| JP | 2013103542 A | * | 5/2013 | ......... | B60R 21/213 |
| JP | 5620187 B2 | * | 11/2014 | | |
| JP | 2019077403 A | * | 5/2019 | | |
| JP | 6602831 B2 | * | 11/2019 | | |
| JP | 2020050165 A | * | 4/2020 | | |
| WO | 2004065180 A1 | | 8/2004 | | |

* cited by examiner

OPEN-FRAME VEHICLE HAVING A TWO-PIECE TRIM MEMBER

FIELD OF THE DISCLOSURE

The present disclosure generally relates to an open-frame vehicle. More specifically, the present disclosure relates to an open-frame vehicle having a two-piece trim member that includes an auxiliary deployment door for an inflatable member.

BACKGROUND OF THE INVENTION

Open-frame vehicles are provided with multiple components. These components can be arranged in a variety of configurations within a segment or class of vehicles to achieve a desired usage. Accordingly, additional packaging arrangements are needed that can provide solutions to challenges in the design and/or manufacturing processes.

SUMMARY OF THE INVENTION

According to a first aspect of the present disclosure, a vehicle includes a frame. The frame includes an A-pillar, a B-pillar, and a roof siderail. The roof siderail extends between the A-pillar and the B-pillar. An A-pillar trim member is coupled to the A-pillar and includes a first portion and a second portion. The first portion defines an aperture that receives the second portion. A B-pillar trim member is coupled to the B-pillar. A roof siderail trim member is coupled to the roof siderail and extends between the A-pillar trim member and the B-pillar trim member. An inflatable member is positioned between the frame and at least two of the A-pillar trim member, the B-pillar trim member, and the roof siderail trim member when the inflatable member is in a deflated state. An inflated state of the inflatable member separates the second portion of the A-pillar trim member from the aperture defined by the first portion of the A-pillar trim member.

Embodiments of the first aspect of the present disclosure can include any one or a combination of the following features:
- the first portion of the A-pillar trim member includes a tab that extends inwardly into the aperture;
- the second portion of the A-pillar trim member defines a receptacle that receives the tab on the first portion of the A-pillar such that the second portion is retained within the aperture defined by the first portion;
- an anchor coupled to at least one of the A-pillar and the A-pillar trim member;
- the anchor extends through the A-pillar trim member;
- a tether coupled to the anchor and the second portion;
- the inflated state of the inflatable member provides a cross-sectional overlap with an immediately adjacent window area of at least about 70%, the window area being positioned between the A-pillar, the B-pillar, and the roof siderail;
- the second portion of the A-pillar trim member includes a first inflection point and a second inflection point;
- the first inflection point and the second inflection point are angularly offset from one another;
- the angular offset of the first and second inflection points place the first inflection point and the second inflection point in a non-parallel relationship with one another;
- the deflated state of the inflatable member includes an inflection point in a region associated with the A-pillar; and
- the deflated state of the inflatable member positions the inflatable member proximate to a first side of the aperture in a region of the A-pillar trim member that is proximate to the roof siderail trim member, wherein the deflated state of the inflatable member positions the inflatable member proximate to a second side of the aperture in a region of the A-pillar trim member that is distal to the roof siderail trim member.

According to a second aspect of the present disclosure, a vehicle includes a frame. The frame includes an A-pillar, a B-pillar, and a roof siderail. The roof siderail extends between the A-pillar and the B-pillar. An A-pillar trim member is coupled to the A-pillar and includes a first portion and a second portion. The first portion defines an aperture that receives the second portion. The first portion includes a tab that extends inwardly from a perimeter of the aperture. The second portion of the A-pillar trim member defines a receptacle that receives the tab on the first portion of the A-pillar such that the second portion is retained within the aperture defined by the first portion. A B-pillar trim member is coupled to the B-pillar. A roof siderail trim member is coupled to the roof siderail and extends between the A-pillar trim member and the B-pillar trim member. An inflatable member is positioned between the frame and at least two of the A-pillar trim member, the B-pillar trim member, and the roof siderail trim member when the inflatable member is in a deflated state. An inflated state of the inflatable member separates the second portion of the A-pillar trim member from the aperture defined by the first portion of the A-pillar trim member.

Embodiments of the second aspect of the present disclosure can include any one or a combination of the following features:
- an anchor coupled to at least one of the A-pillar and the A-pillar trim member, wherein the anchor extends through the A-pillar trim member;
- a tether coupled to the anchor and the second portion;
- the second portion of the A-pillar trim member includes a first inflection point and a second inflection point, wherein the first inflection point and the second inflection point are angularly offset from one another;
- the angular offset of the first and second inflection points place the first inflection point and the second inflection point in a non-parallel relationship with one another;
- the inflated state of the inflatable member provides a cross-sectional overlap with an immediately adjacent window area of at least about 70%, the window area being positioned between the A-pillar, the B-pillar, and the roof siderail;
- the deflated state of the inflatable member includes an inflection point in a region associated with the A-pillar; and
- the deflated state of the inflatable member positions the inflatable member proximate to a first side of the aperture in a region of the A-pillar trim member that is proximate to the roof siderail trim member, wherein the deflated state of the inflatable member positions the inflatable member proximate to a second side of the aperture in a region of the A-pillar trim member that is distal to the roof siderail trim member.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
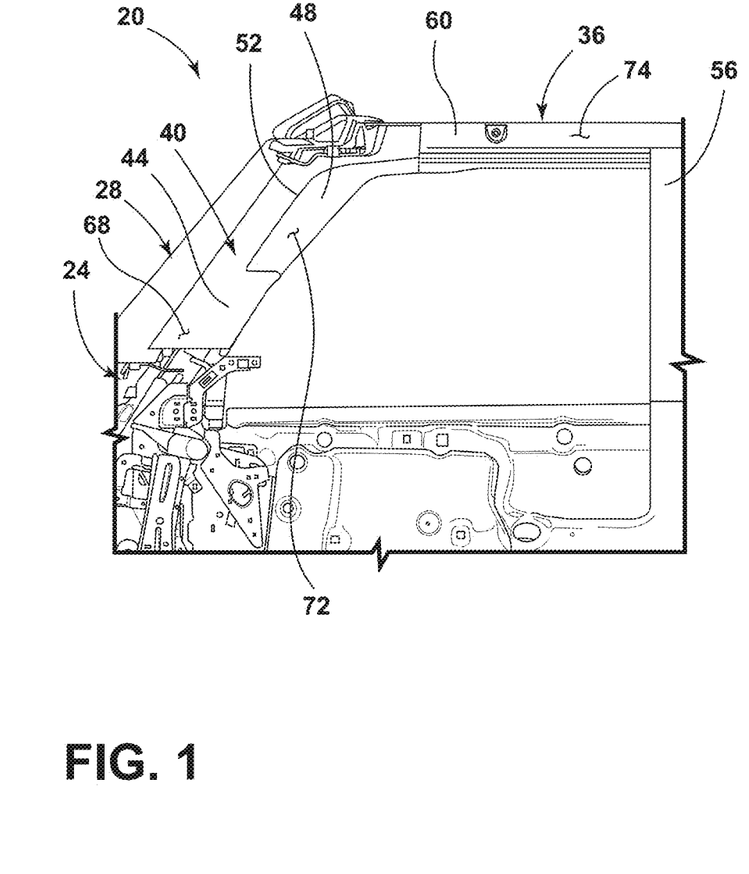
FIG. 1 is an interior side view of a door of a vehicle, illustrating an A-pillar trim member, a B-pillar trim member, and a roof siderail trim member, with an inflatable member in a deflated state, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle having a two-piece trim member. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-10, a vehicle 20 includes a frame 24. The vehicle 20 is an open-frame vehicle, which will be described in further detail herein. The frame 24 includes an A-pillar 28, a B-pillar 32, and a roof siderail 36. The roof siderail 36 extends between the A-pillar 28 and the B-pillar 32. An A-pillar trim member 40 is coupled to the A-pillar 28 and includes a first portion 44 and a second portion 48. The first portion 44 defines an aperture 52 that receives the second portion 48. A B-pillar trim member 56 is coupled to the B-pillar 32. A roof siderail trim member 60 is coupled to the roof siderail 36 and extends between the A-pillar trim member 40 and the B-pillar trim member 56. An inflatable member 64 is positioned between the frame 24 and at least two of the A-pillar trim member 40, the B-pillar trim member 56, and the roof siderail trim member 60 when the inflatable member 64 is in a deflated state (e.g., FIG. 1). An inflated state (e.g., FIGS. 5 and 6) of the inflatable member 64 separates the second portion 48 of the A-pillar trim member 40 from the aperture 52 defined by the first portion 44 of the A-pillar trim member 40. In various examples, the second portion 48 of the A-pillar trim member 40 provides the vehicle 20 with an auxiliary deployment door for the inflatable member 64 in a manner that will be further described herein.

Referring again to FIGS. 1 and 2, an interior side of the vehicle 20 is depicted with the inflatable member 64 in the deflated state (FIG. 1) and a first inflated state (FIG. 2). When the inflatable member 64 is in the deflated state, which may alternatively be referred to as a stowed state, the second portion 48 may be received within the aperture 52 defined by the first portion 44 in such a manner that an exterior surface 68 of the first portion 44, an exterior surface 72 of the second portion 48, and/or an exterior surface 74 of the roof siderail trim member 60 may be level or substantially level with one another. In various examples, a junction between the first portion 44, the second portion 48, and/or the roof siderail trim member 60 may be smooth or substantially smooth such that if a user were to move their finger across the junction between the first portion 44 and the second portion 48, the junction between the first portion 44 and the roof siderail trim member 60, and/or the junction between the second portion 48 and the roof siderail trim member 60, the junction may be minimally perceptible. For example, the second portion 48 may be received within the aperture 52 defined by the first portion 44 such that a distance between abutting edges of the first portion 44, the second portion 48, and/or the roof siderail trim member 60 are separated by less than 5 mm, less than 4 mm, less than 3 mm, less than 2 mm, less than 1 mm, and/or combinations or ranges thereof. Accordingly, a gap between adjacent edges of the first portion 44, the second portion 48, and/or the roof siderail trim member 60 may be less than 5 mm, less than 4 mm, less than 3 mm, less than 2 mm, less than 1 mm, and/or combinations or ranges thereof. One of skill in the art will recognize that the preceding values for the gap between adjacent edges of the first portion 44, the second portion 48, and/or the roof siderail trim member 60 are assumed to have zero millimeters (0 mm) as a lower, non-inclusive, bound. That is, a gap between adjacent edges of the first portion 44, the second portion 48, and/or the roof siderail trim member 60 with a value of zero millimeters (0 mm) may denote a non-existent gap such that the first portion 44, the second portion 48, and/or the roof siderail trim member 60 would be unitarily or integrally formed. That being said, the gap between adjacent edges of the first portion 44, the second portion 48, and/or the roof siderail trim member 60 may be a fraction of a millimeter (e.g., 0.5 mm, 0.05 mm, etc.) while maintaining zero millimeters (0 mm) as a lower bound.

Figure 2:
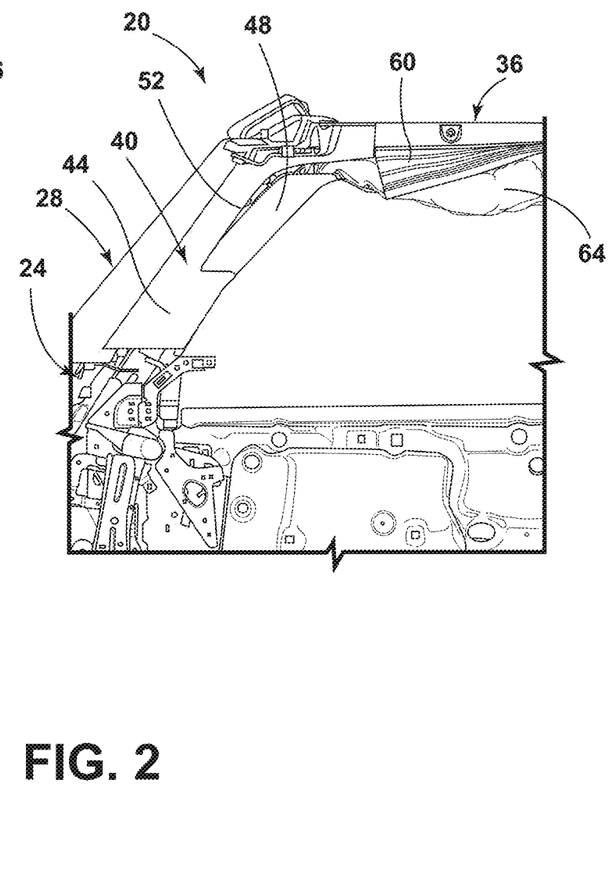
FIG. 2 is an interior side view of the door of the vehicle, illustrating the inflatable member in a first inflated state, according to one example.

Referring further to FIGS. 1 and 2, as the inflatable member 64 is inflated from the deflated state depicted in FIG. 1, the inflatable member 64 may act upon interior surfaces of the first portion 44, the second portion 48, the B-pillar trim member 56, and/or the roof siderail trim member 60. As the inflatable member 64 continues to inflate, the first portion 44, the second portion 48, the B-pillar trim member 56, and/or the roof siderail trim member 60 may begin to deform from the position in which they reside when the inflatable member 64 is in the deflated state. In various examples, the inflation of the inflatable member 64 may begin at the B-pillar trim member 56 and/or the roof siderail trim member 60. Continued inflation of the inflatable member 64 from the deflated state may separate the second portion 48 from the first portion 44 in a region of the A-pillar trim member 40 that is proximate to the roof siderail trim member 60. In some examples, progression of the inflation of the inflatable member 64 may begin proximate to the B-pillar trim member 56, progress along the roof siderail trim member 60, and finally progress to the region associated with the A-pillar trim member 40. Additionally, inflation of the inflatable member 64 may progress in an outward and/or downward direction from the B-pillar trim member 56 and/or the roof siderail trim member 60. As the inflatable member 64 transitions from the deflated state depicted in FIG. 1 to the first inflated state depicted in FIG. 2, the second portion 48 of the A-pillar trim member 40 may begin to separate from the aperture 52 defined by the first portion 44. The separation of the second portion 48 from the first portion 44 as a result of the inflation of the inflatable member 64 may progress in an asymmetrical manner. For example, a region of the second portion 48 that is proximate to the roof siderail trim member 60 may begin to separate from the first portion 44 while a region of the second portion 48 that is distal, or distant, from the roof siderail trim member 60 may remain actively engaged with the aperture 52 of the first portion 44. The active engagement between the second portion 48 and the first portion 44 may be accomplished by an interference fit between the first portion 44 and the second portion 48. For example, the first portion 44 of the A-pillar trim member 40 may include a tab 76 that extends inwardly into the aperture 52 (see FIG. 7). The tab 76 on the first portion 44 may be received by a receptacle 80 that is defined by the second portion 48 of the A-pillar trim member 40 (see FIG. 10). The A-pillar trim member 40 may be provided with a plurality of the tabs 76 and a corresponding number of the receptacles 80. The engagement between the tabs 76 and the receptacles 80 may retain the second portion 48 within the aperture 52 of the first portion 44. A retention force provided by the engagement between the tabs 76 and the receptacles 80 may be overcome by an expansion force or an inflation force provided by the inflatable member 64 as the inflatable member 64 transitions from the deflated state to an at-least-partially-inflated state. Upon the expansion or inflation force increasing to exceed the retention force provided by the tabs 76 and the receptacles 80, the second portion 48 begins to separate from the first portion 44. The expansion or inflation force need not be applied uniformly or directly to an entirety of the second portion 48 to begin separation of the second portion 48 from the first portion 44.

Figure 3:
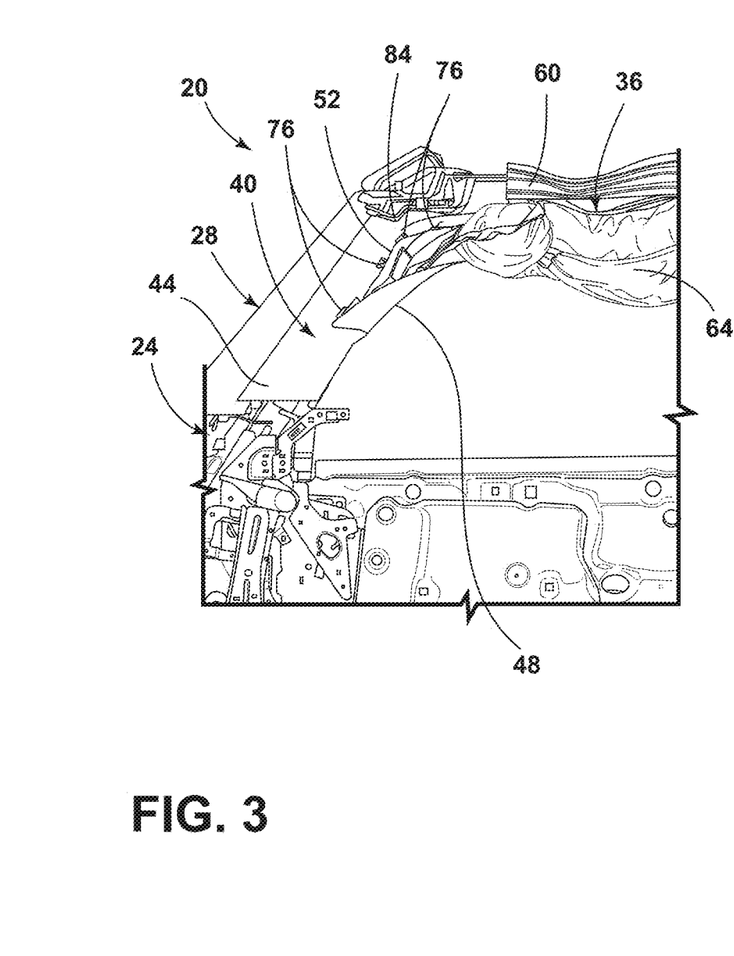
FIG. 3 is an interior side view of the door of the vehicle, illustrating the inflatable member in a second inflated state, according to one example.
Figure 4:
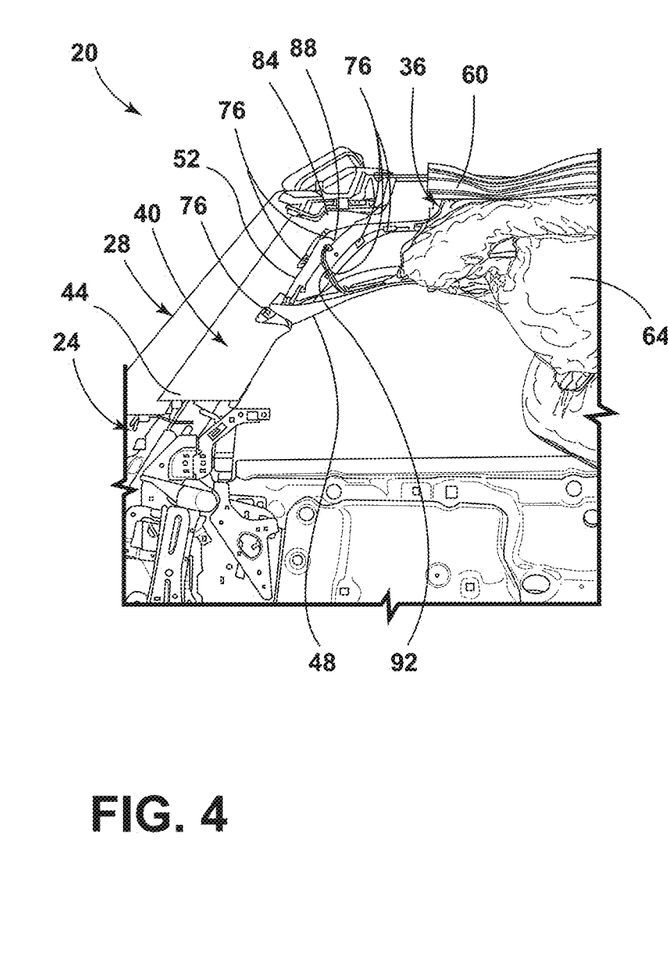
FIG. 4 is an interior side view of the door of the vehicle, illustrating the inflatable member in a third inflated state, according to one example.

Referring now to FIGS. 3 and 4, the inflatable member 64 is depicted in a second inflated state (FIG. 3) and a third inflated state (FIG. 4). The first, second, and third inflated states may be partially-inflated states. As the inflatable member 64 progresses from the first inflated state depicted in FIG. 2 through the second and third inflated states depicted in FIGS. 3 and 4, the inflatable member 64 increases a degree of separation between the second portion 48 and the first portion 44. Additionally, a degree of deformation of the roof siderail trim member 60, the first portion 44, and/or the second portion 48 may increase, at least temporarily, as the inflatable member 64 continues to be inflated from the deflated state on its way to a fully-inflated state. As the inflatable member is inflated, the engagement between the tabs 76 and the receptacles 80 may cease in a simultaneous manner in a given region of the A-pillar trim member 40 while also progressing in a sequential manner for regions of the A-pillar trim member 40 that are at an increasing distance from the junction between the A-pillar trim member 40 and the roof siderail trim member 60. Said another way, tabs 76 that are positioned on opposing sides (e.g., inboard and outboard sides within the same region of the A-pillar trim member 40), may disengage with their corresponding receptacles 80 on the second portion 48 in a simultaneous or substantially simultaneous manner (e.g., within one second of each other) as the inflatable member 64 is further inflated. The sequential disengagement of tabs 76 from their corresponding receptacles 80 can occur between adjacent sections or regions of the A-pillar trim member 40. For example, tabs 76 and receptacles 80 that are positioned proximate to the roof siderail trim member 60 may disengage from one another prior to disengagement of tabs 76 and receptacles 80 that are positioned progressively further from the junction between the A-pillar trim member 40 and the roof siderail trim member 60. Accordingly, once the tabs 76 and receptacles 80 that are immediately adjacent to the junction between the A-pillar trim member 40 and the roof siderail trim member 60 have disengaged, the tabs 76 and the receptacles 80 that are immediately adjacent to the now disengaged tabs 76 and receptacles 80 (e.g., tabs 76 and receptacles 80 proximate to an elbow 84 of the A-pillar trim member 40), may disengage from one another as the inflatable member 64 continues to inflate. Such a progression of the disengagement between the tabs 76 and the receptacles 80 may continue along the contour of the A-pillar trim member 40 with the tabs 76 and the receptacles 80 nearest to the junction between the A-pillar trim member 40 and the roof siderail trim member 60 becoming disengaged from one another prior to disengagement of the tabs 76 and the receptacles 80 that are positioned further from the junction between the A-pillar trim member 40 and the roof siderail trim member 60. An anchor 88 may be coupled to the A-pillar 28 and/or the A-pillar trim member 40 (e.g., the first portion 44). In various examples, the anchor 88 may extend through the A-pillar trim member 40 (e.g., extend through the first portion 44). A tether 92 may be coupled to the anchor 88 and the second portion 48.

Figure 5:
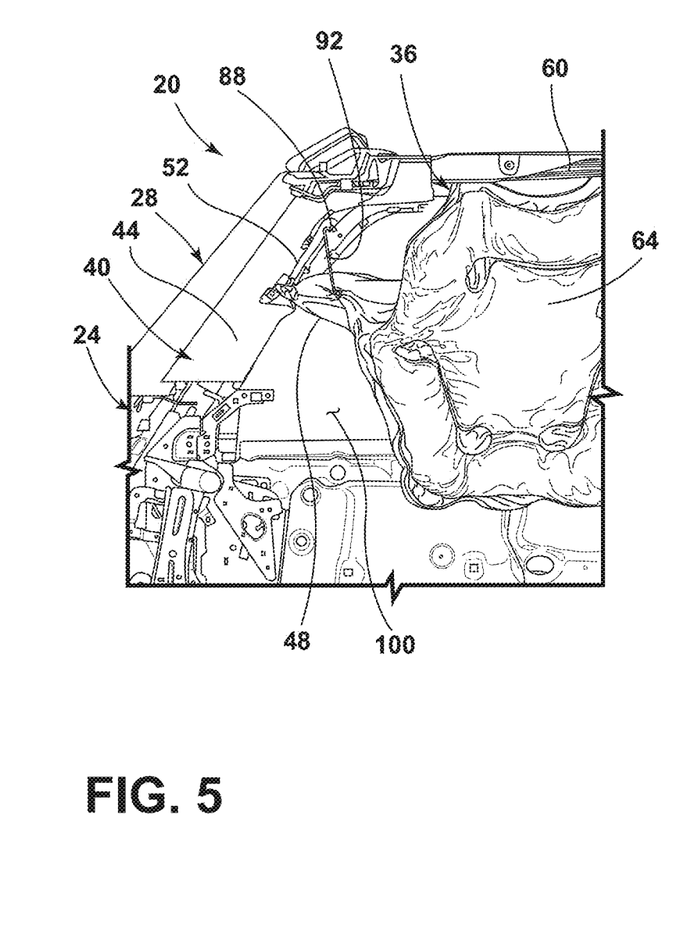
FIG. 5 is an interior side view of the door of the vehicle, illustrating the inflatable member in a fourth inflated state, according to one example.
Figure 6:
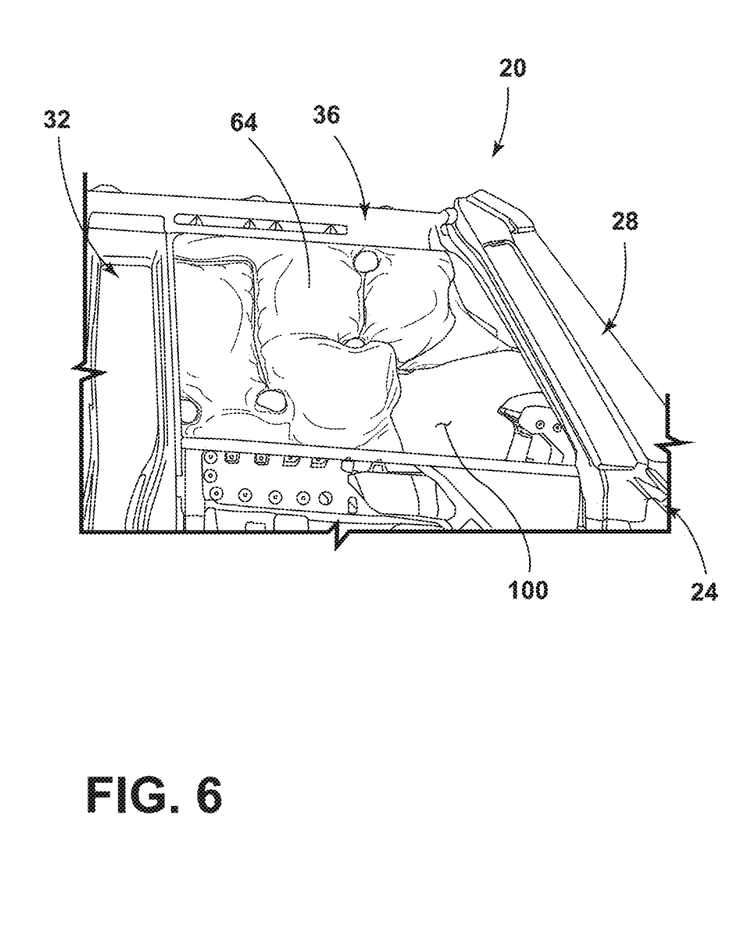
FIG. 6 is an exterior side view of the door of the vehicle, illustrating the inflatable member in a fully-inflated state, according to one example.

Referring to FIGS. 5 and 6, the inflatable member 64 is depicted in a fourth inflated state (FIG. 5) and a fully-inflated state (FIG. 6). The fourth inflated state may be a partially-inflated state or the fully-inflated state. The tether 92 that extends between the anchor 88 and the second portion 48 may be coupled to a corresponding anchor 96 on the second portion 48 (see FIG. 10). The tether 92 can retain the second portion 48 within the vicinity of the A-pillar trim member 40 as the inflatable member 64 is transitioned from the deflated state to the fully-inflated state. By maintaining the second portion 48 within the vicinity of the A-pillar trim member 40 (e.g., within the vicinity of the first portion 44), the tether 92 may decrease the likelihood that the second portion 48 becomes free to move about a cabin of the vehicle 20. Said another way, inflation of the inflatable member 64 may separate the second portion 48 from the first portion 44 of the A-pillar trim member 40 while the interaction between the tether 92 and the second portion 48 decreases the degrees of freedom of movement or extent of movement of the second portion 48 upon separation from the first portion 44. For example, inflation of the inflatable member 64 may dislodge the second portion 48 from the first portion 44 (e.g., partially or entirely dislodged) while a coupling between the first portion 44 and the second portion 48 may be maintained by way of the tether 92. Accordingly, in some examples, upon full inflation of the inflatable member 64 a coupling between the second portion 48 and the first portion 44 may cease with the exception of the coupling of the tether 92 between the first and second portions 44, 48. In other words, the aperture 52 defined by the first portion 44 may be partially or entirely vacated by the second portion 48 upon inflation of the inflatable member 64 while the second portion 48 may remain secured to the first portion 44 by the tether 92. The decoupling of the second portion 48 from the first portion 44 therefore provides the vehicle 20 with an auxiliary deployment door for the inflatable member 64. The inflated state of the inflatable member 64 may provide a cross-sectional overlap with a window area 100 that is immediately adjacent to the inflatable member 64 of at least about 70%. For example, the cross-sectional overlap between the inflatable member 64 in the inflated state and the immediately adjacent window area 100 may be at least about 70%, at least about 75%, at least about 80%, at least about 85%, at least about 90%, at least about 95%, less than 100%, less than about 95%, less than about 90%, less than about 85%, less than about 80%, and/or combinations or ranges thereof. The window area 100 that is immediately adjacent to the inflatable member 64 when the inflatable member 64 is in the inflated state may be positioned between, or defined by, the A-pillar 28, the B-pillar 32, and the roof siderail 36. Reference to the window area 100 is intended to refer to a region of a corresponding door of the vehicle 20 that an occupant can typically see through for viewing an environment exterior to the vehicle 20.

Figure 7:
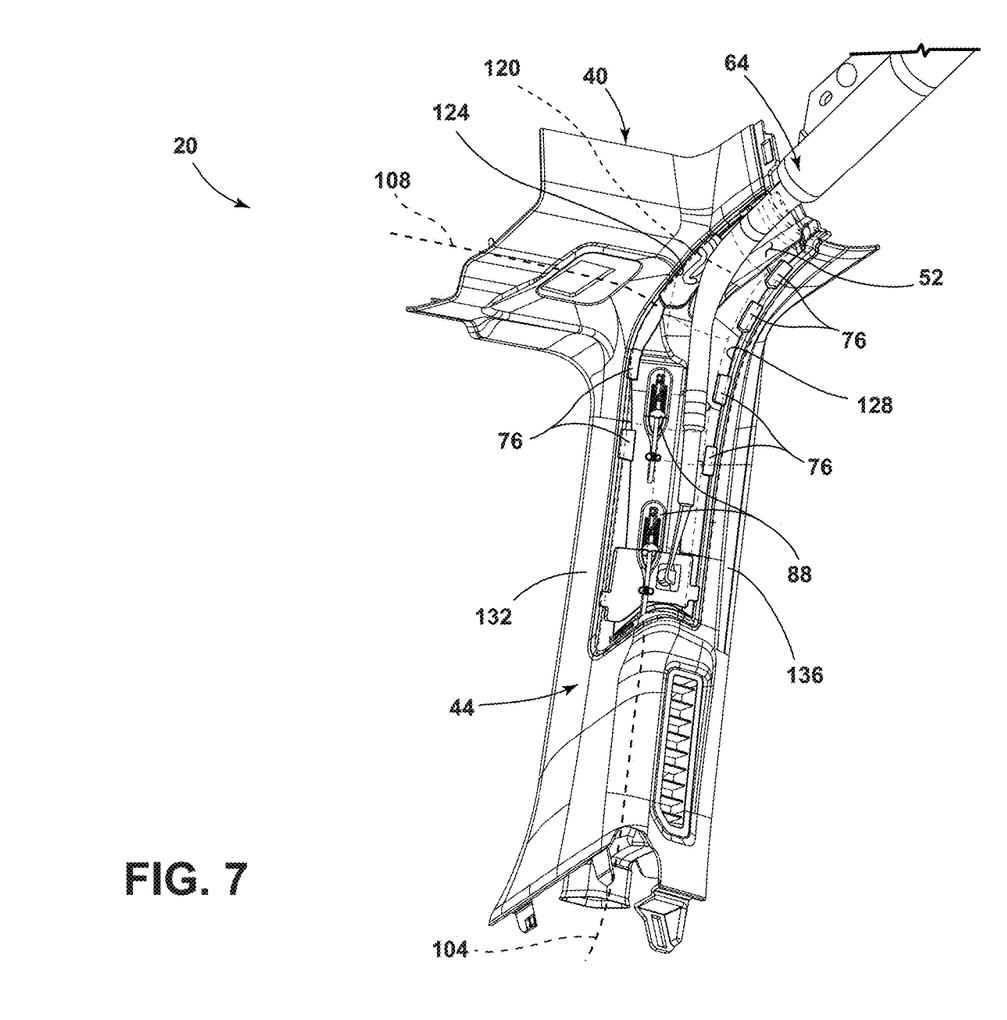
FIG. 7 is a front perspective view of a first portion of the A-pillar trim member, illustrating an interaction between the first portion and the inflatable member, according to one example.
Figure 8:
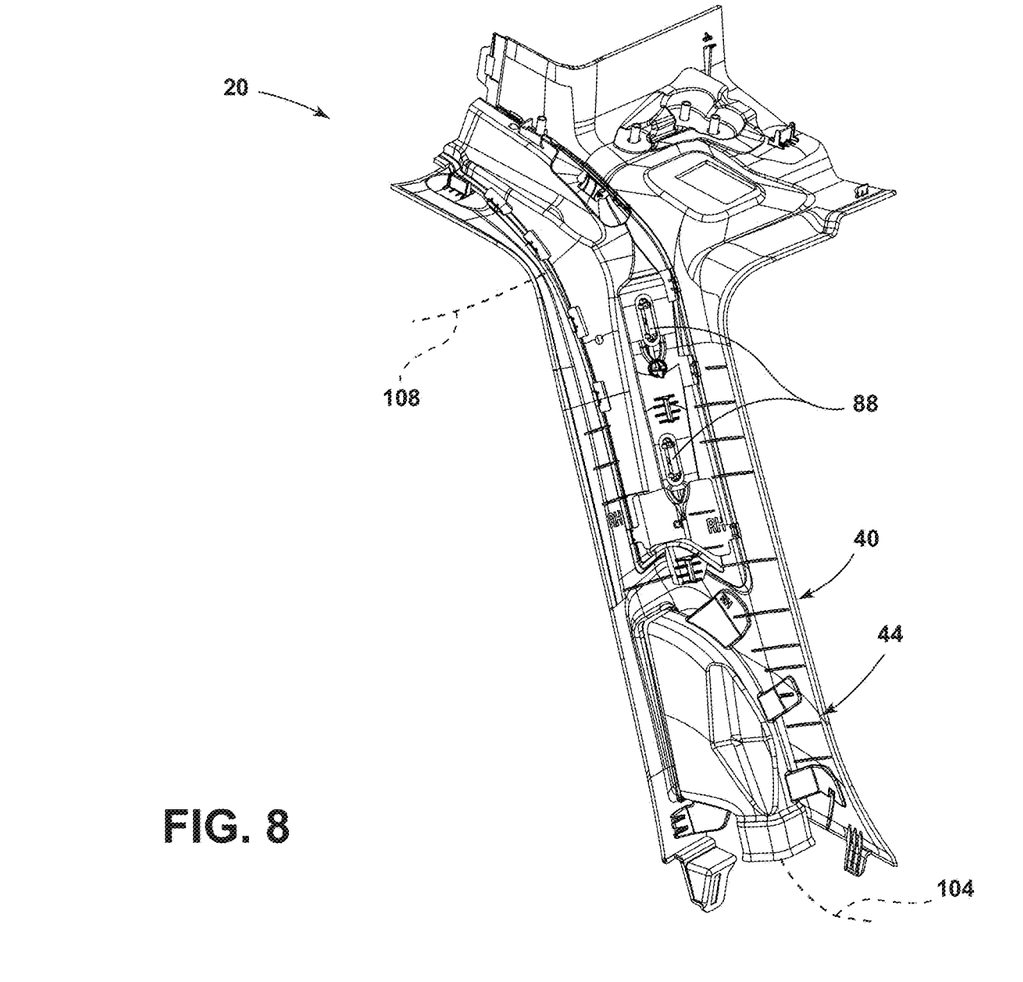
FIG. 8 is a rear perspective view of the first portion of the A-pillar trim member, according to one example.

Referring now to FIGS. 7 and 8, a front side (FIG. 7) and a rear side (FIG. 8) of the A-pillar trim member 40 are depicted. The front side of the A-pillar trim member 40 may alternatively be referred to as an occupant side of the A-pillar trim member 40 as this side of the A-pillar trim member 40 may be proximate to an occupant of the vehicle 20 when in an assembled state. The rear side of the A-pillar trim member 40 may alternatively be referred to as a frame side as this side of the A-pillar trim member 40 is proximate to the frame 24 of the vehicle 20 when in an assembled state. As stated above, the A-pillar trim member 40 includes one or more tabs 76 on the first portion 44 that extend inwardly into the aperture 52 that is defined by the first portion 44. Said another way, the tabs 76 on the first portion 44 extend inwardly from a perimeter of the aperture 52 defined by the first portion 44. The A-pillar trim member 40 may include one or more of the anchors 88 that are coupled to the A-pillar 28 and/or the A-pillar trim member 40 (e.g., the first portion 44). In various examples, one or more of the anchors 88 may extend through the A-pillar trim member 40, for example, may extend through the first portion 44. The A-pillar trim member 40 may include a first inflection point 104 and a second inflection point 108. The first and second inflection points 104, 108 are angularly offset from one another. The angular offset of the first and second inflection points 104, 108 may place the first and second inflection points 104, 108 in a non-parallel relationship with one another. For example, the angular offset between the first and second inflection points 104, 108 may be about 10°, about 20°, about 30°, about 40°, about 50°, about 60°, about 70°, about 80°, about 90°, about 100°, about 110°, about 120°, about 130°, about 140°, about 150°, and/or combinations or ranges thereof. The inflatable member 64 can include an inflection point 120 in a region of the inflatable member 64 that is associated with the A-pillar 28 and/or the A-pillar trim member 40. In various examples, the deflated state of the inflatable member 64 positions the inflatable member 64 proximate to a first side 124 of the aperture 52 in a region of the A-pillar trim member 40 that is proximate to the roof siderail trim member 60. Additionally or alternatively, the deflated state of the inflatable member 64 may position the inflatable member 64 proximate to a second side 128 of the aperture 52 in a region that is distal to the roof siderail trim member 60. The first side 124 of the aperture 52 may be proximate to an inboard side 132 of the A-pillar trim member 40. The second side 128 of the aperture 52 may be proximate to an outboard side 136 of the A-pillar trim member 40.

Figure 9:
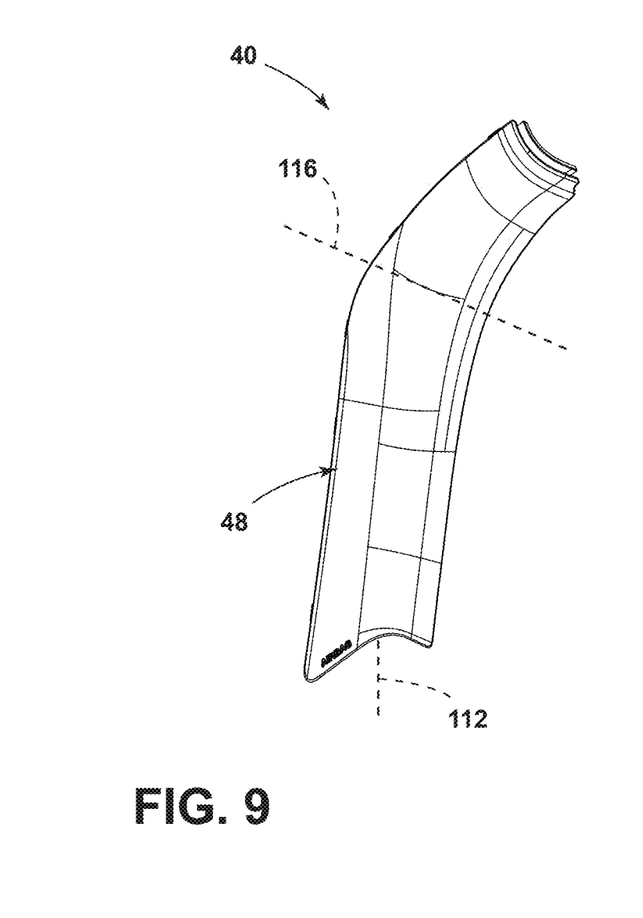
FIG. 9 is a front perspective view of a second portion of the A-pillar trim member, according to one example.
Figure 10:
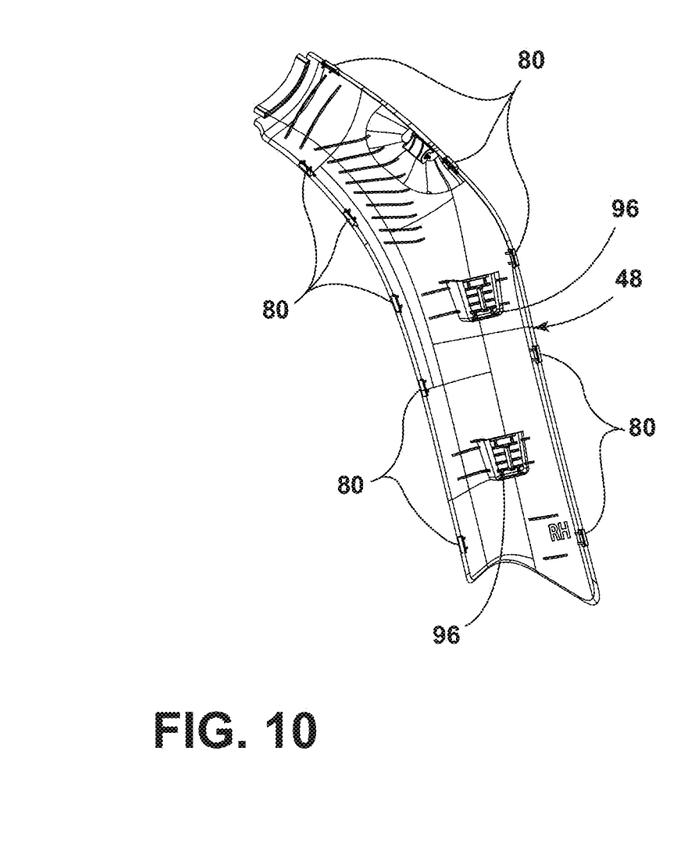
FIG. 10 is a rear perspective view of the second portion of the A-pillar trim member, according to one example.

Referring to FIGS. 9 and 10, the second portion 48 of the A-pillar trim member 40 is shown from a front side (FIG. 9) and an interior or rear side (FIG. 10). As with the first portion 44, the front side of the second portion 48 may alternatively be referred to as an occupant side of the second portion 48 as the side of the second portion 48 is proximate to an occupant of the vehicle 20 when in an assembled state. Similarly, the interior or rear side of the second portion 48 may alternatively be referred to as a frame side of the second portion 48 as the side of the second portion 48 is proximate to the frame 24 of the vehicle 20 when in an assembled state. One of skill in the art will recognize that although the interior or frame side of the second portion 48 is referred to as the interior or frame side, the first portion 44 of the A-pillar trim member 40 may be positioned between the second portion 48 and the frame 24. The second portion 48 fits within the aperture 52 defined by the first portion 44. Accordingly, the second portion 48 of the A-pillar trim member 40 can include a first inflection point 112 and a second inflection point 116 that generally correspond with the first and second inflection points 104, 108 of the first portion 44. In various examples, the first inflection point 104 of the first portion 44 and the first inflection point 112 of the second portion 48 may correspond with one another or generally overlap. Similarly, the second inflection point 108 of the first portion 44 and the second inflection point 116 of the second portion 48 may correspond with one another or generally overlap. As with the first portion 44, the first inflection point 112 and the second inflection point 116 of the second portion 48 may be angularly offset from one another. The angular offset of the first and second inflection points 112, 116 may place the first and second inflection points 112, 116 in a non-parallel relationship with one another. The angular offset of the first and second inflection points 112, 116 may place the first and second inflection points 112, 116 in a non-parallel relationship with one another. For example, the angular offset between the first and second inflection points 104, 108 may be about 10°, about 20°, about 30°, about 40°, about 50°, about 60°, about 70°, about 80°, about 90°, about 100°, about 110°, about 120°, about 130°, about 140°, about 150°, and/or combinations or ranges thereof.

The A-pillar trim member 40 of the present disclosure is provided as a two-piece construction where the second portion 48 is detachably coupled to the aperture 52 defined by the first portion 44. Providing such an arrangement enables partial or complete separation of the second portion 48 from the aperture 52 upon inflation of the inflatable member 64, while maintaining the second portion 48 in the vicinity of the first portion 44 by way of the anchor 88 and tether 92 arrangement. If the A-pillar trim member 40 were not provided with the first and second portions 44, 48 in the manner discussed herein, the A-pillar trim member 40 may experience an increased amount of stress and/or strain during inflation of the inflatable member 64. Additionally, the A-pillar trim member 40 of the present disclosure may be beneficial for use in an open-frame vehicle. Open-frame vehicles are vehicles where portions of a roof of the vehicle are removable, thereby giving rise to the terminology of an "open-frame" (e.g., removable roof panels and/or closure panels). Consumers may find these types of vehicles desirable, particularly during spring, summer, and/or fall months of the year. However, open-frame vehicles can present some packaging constraints for various components of the vehicle 20. For example, without a permanent roof and/or headliner in the cabin of the vehicle 20, components such as the inflatable member 64 may be confined to installation along the frame 24.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. An open-frame vehicle, comprising:
   a frame that comprises an A-pillar, a B-pillar, and a roof siderail that extends between the A-pillar and the B-pillar;
   a roof panel that is removably coupled to the frame such that the roof panel is movable between a coupled state and a decoupled state relative to the frame, wherein the roof panel is adjacent to the roof siderail;
   an A-pillar trim member coupled to the A-pillar and comprising a first portion and a second portion, wherein the first portion defines an aperture that receives the second portion;
   a B-pillar trim member coupled to the B-pillar;
   a roof siderail trim member coupled to the roof siderail and extending between the A-pillar trim member and the B-pillar trim member, wherein the A-pillar trim member, the B-pillar trim member, and the roof siderail trim member are each free of direct coupling with the roof panel such that a relative positioning of the A-pillar trim member, the B-pillar trim member, and the roof siderail trim member are independent of whether the roof panel is in the coupled state or the decoupled state; and
   an inflatable member positioned between the frame and at least two of the A-pillar trim member, the B-pillar trim member, and the roof siderail trim member when the inflatable member is in a deflated state, wherein an inflated state of the inflatable member separates the second portion of the A-pillar trim member from the aperture defined by the first portion of the A-pillar trim member.

2. The open-frame vehicle of claim 1, wherein the first portion of the A-pillar trim member comprises a tab that extends inwardly into the aperture.

3. The open-frame vehicle of claim 2, wherein the second portion of the A-pillar trim member defines a receptacle that receives the tab on the first portion of the A-pillar such that the second portion is retained within the aperture defined by the first portion.

4. The open-frame vehicle of claim 1, further comprising:
   an anchor coupled to at least one of the A-pillar and the A-pillar trim member.

5. The open-frame vehicle of claim 4, wherein the anchor extends through the A-pillar trim member.

6. The open-frame vehicle of claim 4, further comprising:
   a tether coupled to the anchor and the second portion.

7. The open-frame vehicle of claim 1, wherein the inflated state of the inflatable member provides a cross-sectional overlap with an immediately adjacent window area of at least about 70%, the window area being positioned between the A-pillar, the B-pillar, and the roof siderail.

8. The open-frame vehicle of claim 1, wherein the second portion of the A-pillar trim member comprises a first inflection point and a second inflection point.

9. The open-frame vehicle of claim 8, wherein the first inflection point and the second inflection point are angularly offset from one another.

10. The open-frame vehicle of claim 9, wherein the angular offset of the first and second inflection points place the first inflection point and the second inflection point in a non-parallel relationship with one another.

11. The open-frame vehicle of claim 1, wherein the deflated state of the inflatable member comprises an inflection point in a region associated with the A-pillar.

12. The open-frame vehicle of claim 11, wherein the deflated state of the inflatable member positions the inflatable member proximate to a first side of the aperture in a region of the A-pillar trim member that is proximate to the roof siderail trim member, and wherein the deflated state of the inflatable member positions the inflatable member proximate to a second side of the aperture in a region of the A-pillar trim member that is distal to the roof siderail trim member.

13. An open-frame vehicle, comprising:
   a frame that comprises an A-pillar, a B-pillar, and a roof siderail that extends between the A-pillar and the B-pillar;
   a roof panel that is removably coupled to the frame such that the roof panel is movable between a coupled state and a decoupled state relative to the frame, wherein the roof panel is adjacent to the roof siderail;
   an A-pillar trim member coupled to the A-pillar and comprising a first portion and a second portion, wherein the first portion defines an aperture that receives the second portion, wherein the first portion comprises a tab that extends inwardly from a perimeter of the aperture, wherein the second portion of the A-pillar trim member defines a receptacle that receives the tab on the first portion of the A-pillar such that the second portion is retained within the aperture defined by the first portion;
   a B-pillar trim member coupled to the B-pillar;
   a roof siderail trim member coupled to the roof siderail and extending between the A-pillar trim member and the B-pillar trim member, wherein the A-pillar trim member, the B-pillar trim member, and the roof siderail trim member are each free of direct coupling with the roof panel such that a relative positioning of the A-pillar trim member, the B-pillar trim member, and the roof siderail trim member are independent of whether the roof panel is in the coupled state or the decoupled state; and
   an inflatable member positioned between the frame and at least two of the A-pillar trim member, the B-pillar trim member, and the roof siderail trim member when the inflatable member is in a deflated state, wherein an inflated state of the inflatable member separates the second portion of the A-pillar trim member from the aperture defined by the first portion of the A-pillar trim member.

14. The open-frame vehicle of claim 13, further comprising:
   an anchor coupled to at least one of the A-pillar and the A-pillar trim member, wherein the anchor extends through the A-pillar trim member.

15. The open-frame vehicle of claim 14, further comprising:
   a tether coupled to the anchor and the second portion.

16. The open-frame vehicle of claim 13, wherein the second portion of the A-pillar trim member comprises a first inflection point and a second inflection point, wherein the first inflection point and the second inflection point are angularly offset from one another.

17. The open-frame vehicle of claim 16, wherein the angular offset of the first and second inflection points place the first inflection point and the second inflection point in a non-parallel relationship with one another.

18. The open-frame vehicle of claim 13, wherein the inflated state of the inflatable member provides a cross-sectional overlap with an immediately adjacent window area of at least about 70%, the window area being positioned between the A-pillar, the B-pillar, and the roof siderail.

19. The open-frame vehicle of claim 13, wherein the deflated state of the inflatable member comprises an inflection point in a region associated with the A-pillar.

20. The open-frame vehicle of claim 19, wherein the deflated state of the inflatable member positions the inflatable member proximate to a first side of the aperture in a region of the A-pillar trim member that is proximate to the roof siderail trim member, and wherein the deflated state of the inflatable member positions the inflatable member proximate to a second side of the aperture in a region of the A-pillar trim member that is distal to the roof siderail trim member.

* * * * *